(12) United States Patent
Singh

(10) Patent No.: US 11,962,618 B2
(45) Date of Patent: Apr. 16, 2024

(54) SYSTEMS AND METHODS FOR PROTECTION AGAINST THEFT OF USER CREDENTIALS BY EMAIL PHISHING ATTACKS

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 643 days.

(21) Appl. No.: 17/135,456

(22) Filed: Dec. 28, 2020

(65) Prior Publication Data

US 2022/0210186 A1 Jun. 30, 2022

(51) Int. Cl.
*H04L 9/40* (2022.01)
*G06F 16/953* (2019.01)
*G06Q 10/107* (2023.01)

(52) U.S. Cl.
CPC ........ *H04L 63/1483* (2013.01); *G06F 16/953* (2019.01); *G06Q 10/107* (2013.01)

(58) Field of Classification Search
CPC . H04L 63/1483; H04L 51/212; G06F 16/953; G06F 21/56; G06Q 10/107
See application file for complete search history.

(56) References Cited

U.S. PATENT DOCUMENTS

| | | | | |
|---|---|---|---|---|
| 7,590,698 B1 * | 9/2009 | Cooley | ............... | H04L 63/1483 709/206 |
| 8,347,394 B1 * | 1/2013 | Lee | ....................... | G06F 21/554 726/25 |
| 9,264,440 B1 * | 2/2016 | Stern | .................... | H04L 63/1408 |
| 9,361,602 B1 * | 6/2016 | Hodges | ................... | H04L 51/42 |
| 10,284,579 B2 * | 5/2019 | Goutal | ................ | H04L 63/1483 |
| 2006/0053476 A1 * | 3/2006 | Bezilla | .................. | G06F 21/552 713/193 |
| 2016/0014151 A1 * | 1/2016 | Prakash | ................... | H04L 47/62 726/22 |
| 2019/0014149 A1 * | 1/2019 | Cleveland | .............. | G06N 3/045 |
| 2021/0126944 A1 * | 4/2021 | Lesperance | ......... | H04L 63/1433 |

FOREIGN PATENT DOCUMENTS

| | | | | |
|---|---|---|---|---|
| KR | 101512700 B1 * | 4/2015 | ............. | H04L 12/22 |
| WO | WO-2015023316 A1 * | 2/2015 | ............. | G06F 21/51 |

OTHER PUBLICATIONS

International Search Report and Written Opinion dated Mar. 22, 2022 for International Application No. PCT/US2021/064912 (10 pages).

* cited by examiner

*Primary Examiner* — Sarah Su

(57) ABSTRACT

A computer system is provided. The computer system includes a memory and at least one processor coupled to the memory and configured to provide protection against theft of user credentials by email phishing attacks. The at least one processor is further configured to identify a company name included in a received email; identify a link in the received email; extract a domain name from the identified link; search a linkmap for an existing record associated with the identified company name, wherein the linkmap comprises a collection of records, the records relating names of companies to trusted domain names; determine if the extracted domain name matches a trusted domain name of the existing record; and identify the received email as genuine in response to the determination of the match.

18 Claims, 6 Drawing Sheets

SYSTEMS AND METHODS FOR PROTECTION AGAINST THEFT OF USER CREDENTIALS BY EMAIL PHISHING ATTACKS

BACKGROUND

Cyber security is an issue of great importance, as attacks on computer systems and the users of those systems continue to increase. One such form of attack is known as an "email phishing attack," in which the user receives an email that appears legitimate but contains a malicious link. If the user clicks on the link, they can be directed to a hacker's website which can then ask the user to login using their credentials or take other steps to steal information or compromise security.

SUMMARY

In at least one example, a computer system is provided. The computer system includes a memory; and at least one processor coupled to the memory and configured to: identify a company name included in a received email; identify a link in the received email; extract a domain name from the identified link; search a linkmap for an existing record associated with the identified company name, wherein the linkmap comprises a collection of records, the records relating names of companies to trusted domain names; determine if the extracted domain name matches a trusted domain name of the existing record; and identify the received email as genuine in response to the determination of a match.

At least some examples of the computer system can include one or more of the following features. The at least one processor is further configured to generate a warning that the received email is suspect in response to a failure to determine the match. The at least one processor is further configured to identify the company name included in the received email based on analysis of one or more of a signature, an address in a footer, a logo, and a body of text, included in the received email. The at least one processor is further configured to identify the company name included in the received email based on application of computer vision techniques and/or language processing techniques to the received email. The at least one processor is further configured to create a new record, if the search of the linkmap fails to provide the existing record, wherein the new record comprises an identification of a recipient of the email, the identified company name, the extracted domain name, and a timestamp. The at least one processor is further configured to accumulate a plurality of new records over a period of time and update the linkmap based on the new records when a number of the new records exceeds a first threshold, the period of time exceeds a second threshold, and a number of email recipients exceeds a third threshold. The at least one processor is further configured to employ a search engine to obtain a suggested trusted domain name associated with the identified company name and identify the received email as genuine in response to determining that the suggested trusted domain name matches the extracted domain name.

In at least one example, a method for protection against theft of user credentials is provided. The method includes identifying, by a computer system, a company name included in a received email; identifying, by the computer system, a link in the received email; extracting, by the computer system, a domain name from the identified link; searching, by the computer system, a linkmap for an existing record associated with the identified company name, wherein the linkmap comprises a collection of records, the records relating names of companies to trusted domain names; and determining, by the computer system, if the extracted domain name matches a trusted domain name of the existing record.

At least some examples of the method can include one or more of the following features. The act of identifying the received email as genuine in response to the determination of a match and generating a warning that the received email is suspect in response to a failure to determine the match. The act of identifying the company name included in the received email based on analysis of one or more of a signature, an address in a footer, a logo, and a body of text, included in the received email. The act of identifying the company name included in the received email based on application of computer vision techniques and/or language processing techniques to the received email. The act of creating a new record, if the search of the linkmap fails to provide the existing record, wherein the new record comprises an identification of a recipient of the email, the identified company name, the extracted domain name, and a timestamp. The act of accumulating a plurality of new records over a period of time and updating the linkmap based on the new records when a number of the new records exceeds a first threshold, the period of time exceeds a second threshold, and a number of email recipients exceeds a third threshold. The act of employing a search engine to obtain a suggested trusted domain name associated with the identified company name and identifying the received email as genuine in response to determining that the suggested trusted domain name matches the extracted domain name.

In at least one example, a non-transitory computer readable medium storing executable sequences of instructions to provide protection against theft of user credentials is provided. The sequences of instructions include instructions to: identify a company name included in a received email; identify a link in the received email; extract a domain name from the identified link; search a linkmap for an existing record associated with the identified company name, wherein the linkmap comprises a collection of records, the records relating names of companies to trusted domain names; determine if the extracted domain name matches a trusted domain name of the existing record; and identify the received email as genuine in response to the determination of a match.

At least some examples of the non-transitory computer readable medium can include one or more of the following features. Instructions to generate a warning that the received email is suspect in response to a failure to determine the match. Instructions to identify the company name included in the received email based on analysis of one or more of a signature, an address in a footer, a logo, and a body of text, included in the received email. Instructions to identify the company name included in the received email based on application of computer vision techniques and/or language processing techniques to the received email. Instructions to create a new record, if the search of the linkmap fails to provide the existing record, wherein the new record comprises an identification of a recipient of the email, the identified company name, the extracted domain name, and a timestamp. Instructions to accumulate a plurality of new records over a period of time and update the linkmap based on the new records when a number of the new records exceeds a first threshold, the period of time exceeds a second threshold, and a number of email recipients exceeds a third threshold. Instructions to employ a search engine to obtain a suggested trusted domain name associated with the identified company name and identify the received email as genuine in response to determining that the suggested trusted domain name matches the extracted domain name.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
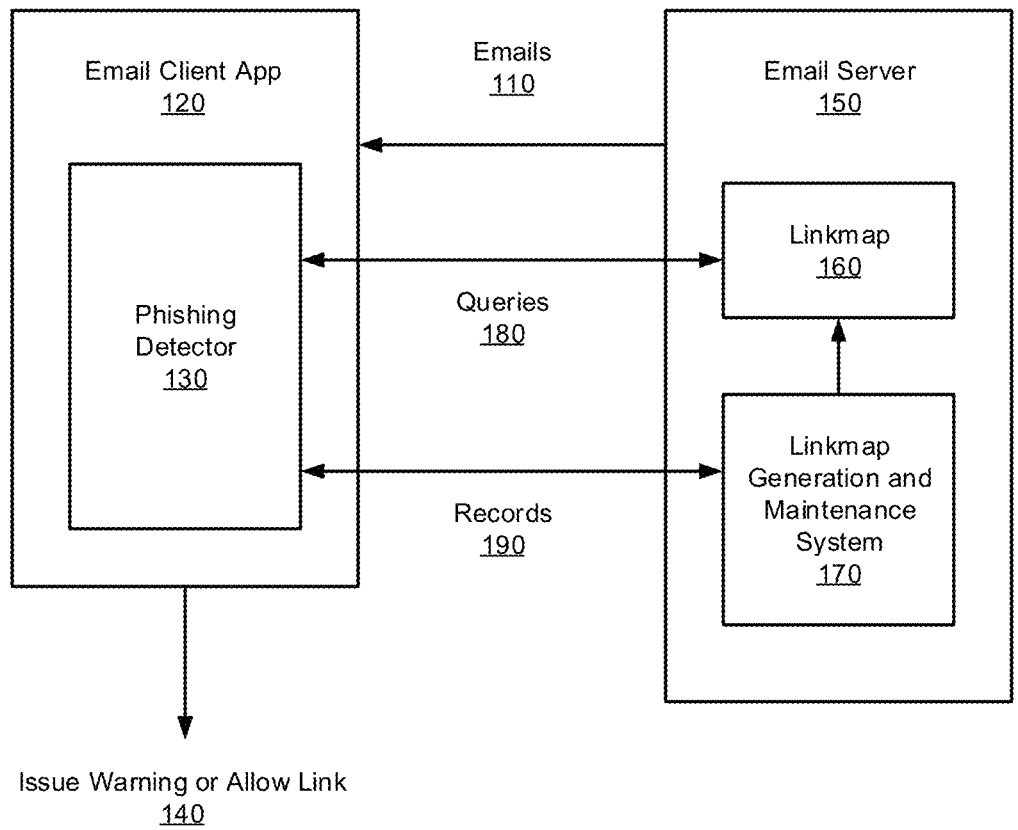
FIG. 1 is a top-level block diagram of an implementation of a system for providing protection against theft of user credentials by email phishing attacks, in accordance with an example of the present disclosure.

As noted previously, cyber security is an issue of great importance, as attacks on computer systems and the users of those systems continue to increase. One such form of attack, the "email phishing attack," directs an email to the user which appears to be legitimate but contains a malicious link. Upon clicking the link, the user is directed to a hacker's website where the user can be asked to present login credentials. In some cases, these links may be presented as buttons to be clicked, which can hide the uniform resource locator (URL) link details from the user. However, even if the URL is presented in plain view, most users do not take the time to examine them closely and would likely not notice the warning signs, such as a misspelling that involves the insertion, deletion, or modification of perhaps just a single letter. Hackers can be skilled at this, for example, changing an "m" to "nn". Many similar tricks of this nature may be employed which a user might easily overlook.

To address these problems, and as summarized above, various examples described herein are directed to systems and methods for protection against theft of user credentials by email phishing attacks. In some examples, the disclosed techniques provide protection by analyzing received emails to detect the name of the company or organization that sends the email. The company name will typically be the correct name of a trusted entity and prominently displayed in a manner designed to solicit positive attention from the user. The email is then searched for links (which may include URLs and/or email addresses) which are extracted and analyzed to determine the domain name embedded in the link. If the email is a phishing email, the domain name will be altered in some way from the genuine domain name for that legitimate company. The alteration is detected by querying a database (herein referred to as a linkmap) which links known company names to legitimate domain names for those companies. In some examples, the phishing detection is performed by an email client application (or app) on the user's device (mobile, laptop, workstation, etc.), while the linkmap is stored and maintained on an email server that provides the emails to the email client app, or on another server.

In some examples, the linkmap is generated and updated, by collecting data records from multiple email client apps associated with multiple users, over a period of time. The data records provide the company names and company domain names that are extracted from emails. If a given company name is associated with a particular domain name, and a relatively large number of emails from a relatively large number of users over a sufficiently long period of time are collected, then that link of company name to domain name may be considered to be legitimate and added to the linkmap database. In some examples, this may be corroborated by a search of the company name, using a search engine and trusted information sources, to verify legitimate domain names associated with that company.

In some examples, the generation, update, and storage of the linkmap may be performed on the email server. In some examples, a copy of the current linkmap may be cached on the email client app for speed and convenience, and periodically updated or synchronized with the copy of the linkmap on the email server, for example when the client app connects with the server.

As will be understood in view of this disclosure, the systems and methods for providing protection against theft of user credentials by email phishing attacks provided herein have several advantages over existing methods which attempt to analyze the linked web pages to detect malicious code in those pages. Attempting to detect malicious code can be unreliable however, as new hacking techniques are continually being developed which employ new code. Some other existing techniques attempt to load the webpage in a protected "sandbox" to perform analysis, but such analysis may take too much time and the user may click on the link before the analysis is completed. Thus, the disclosed techniques are more robust and reliable than existing techniques because they do not rely on the detection of any specific malicious code or tactics that may be used by an attacker.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Password Protection System

FIG. 1 is a top-level block diagram of an implementation of a system 100 for providing protection against theft of user credentials by email phishing attacks, in accordance with an example of the present disclosure. As shown in FIG. 1, an email server 150 provides emails 110 to an email client app 120. The system includes a phishing detector 130, which may be embedded in the email client app 120. The system also includes a linkmap 160 and a linkmap generation and maintenance system 170, which can be embedded in the email server 150. Although only one email client app 120 is shown, it will be appreciated that in general, multiple email client apps may exist, for example one app for each user connected to the email server 150, with each email app incorporating a phishing detector 130.

Operation of the phishing detector 130 and linkmap 160 will be described in greater detail below, but at a high level, the phishing detector 130 is configured to analyze emails 110 received from the email server 150 to determine the name of the company or organization that is purportedly sending the email, and to extract links (also referred to as hyperlinks) that may be embedded in the email. The linkmap 160 is then queried 180 to determine if there is a legitimate association between the company and the extracted domain name. The system may either issue a warning or allow the user to navigate to the link 140, based on that determination. For example, if there is not a legitimate association, a warning may be issued to the user, and possibly to an information technology (IT) administrator. The linkmap generation and maintenance system 170 is configured to create and update the linkmap 160 based on information acquired (records 190) from the emails of many users over a period of time, as will be explained in greater detail below.

Figure 2:
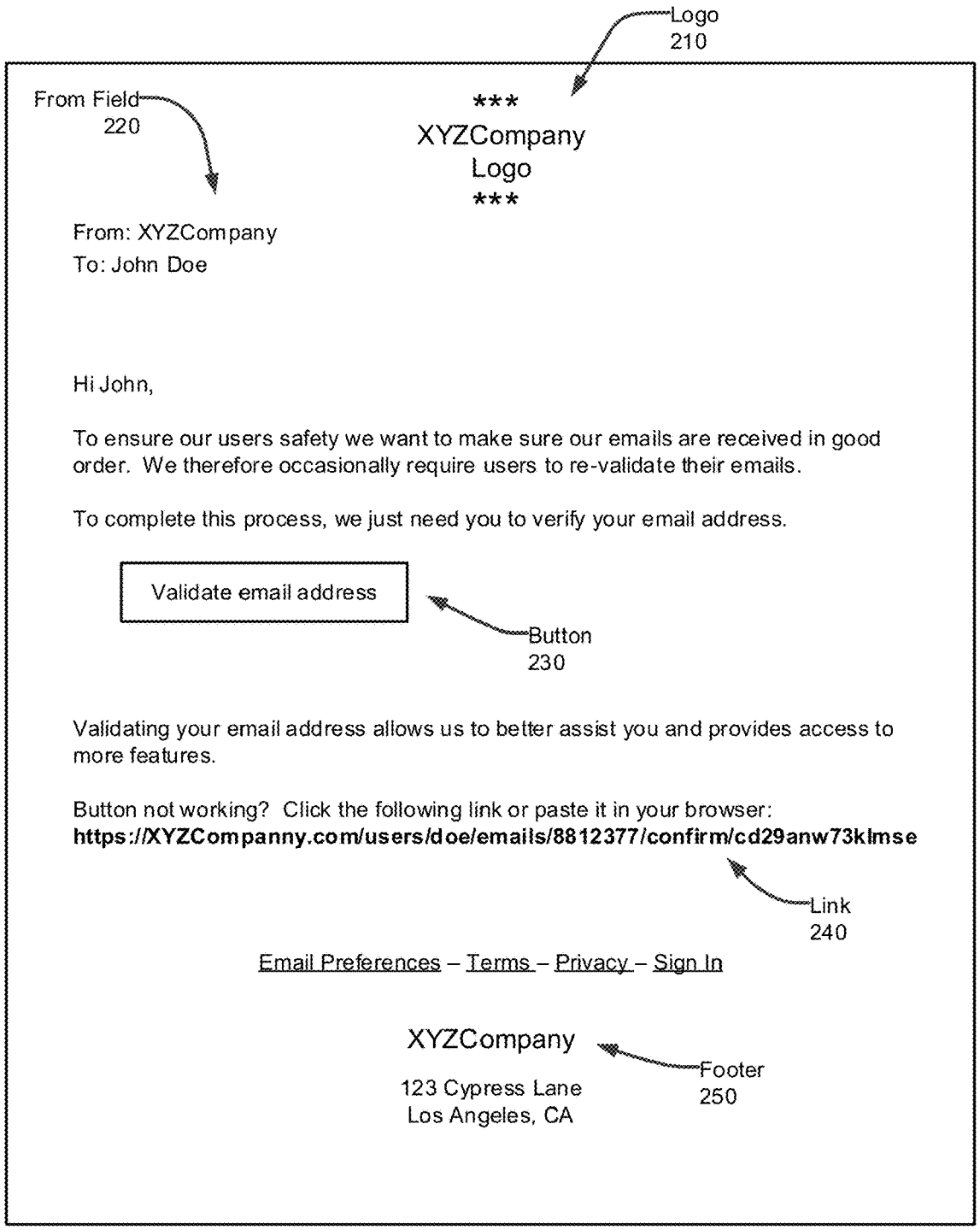
FIG. 2 illustrates a phishing email, in accordance with an example of the present disclosure.

FIG. 2 illustrates a phishing email 200, in accordance with an example of the present disclosure. The phishing email is shown to include a logo 210, a "from" field 220, a button 230 (asking the user to validate their email address), a link or hyperlink 240 (that can be used as an alternative to the button), and a footer 250. The logo 210, the "from" field 220, and the footer (or signature block) 250, are shown to present the company name "XYZCompany" with the correct spelling and in the correct format that the user would expect and trust. The logo 210 will generally duplicate the genuine logo of the company. The fonts, designs, and color schemes throughout the email may also match the appearance that would be expected in a genuine email from the company. The link 240, however, employs a URL in which "XYZ-Company" is misspelled as "XYZ companny" (i.e., with two n's). The misspelling may be similar enough to the correct name that many users will fail to notice the difference, if they take the time to examine it at all. The misspelling allows the link to redirect the user to a malicious website. Additionally, the button 230 can employ the same URL, with the link to the malicious website, while hiding the URL until the user hovers a mouse over the button. While this is one example of a phishing email, other possibilities exist which may present additional (or fewer) fields, features, and links. In some examples, links may include email addresses which contain a domain name. The email addresses may be embedded in the phishing email 200 or they may be the email address of the sender of the phishing email.

Password Protection Process

As described above, some examples of the system 100 of FIG. 1 are configured to perform a process for providing protection against theft of user credentials by email phishing attacks. The processes may be executed on a processor of any suitable type (e.g., processor 610 of FIG. 6).

Figure 3:
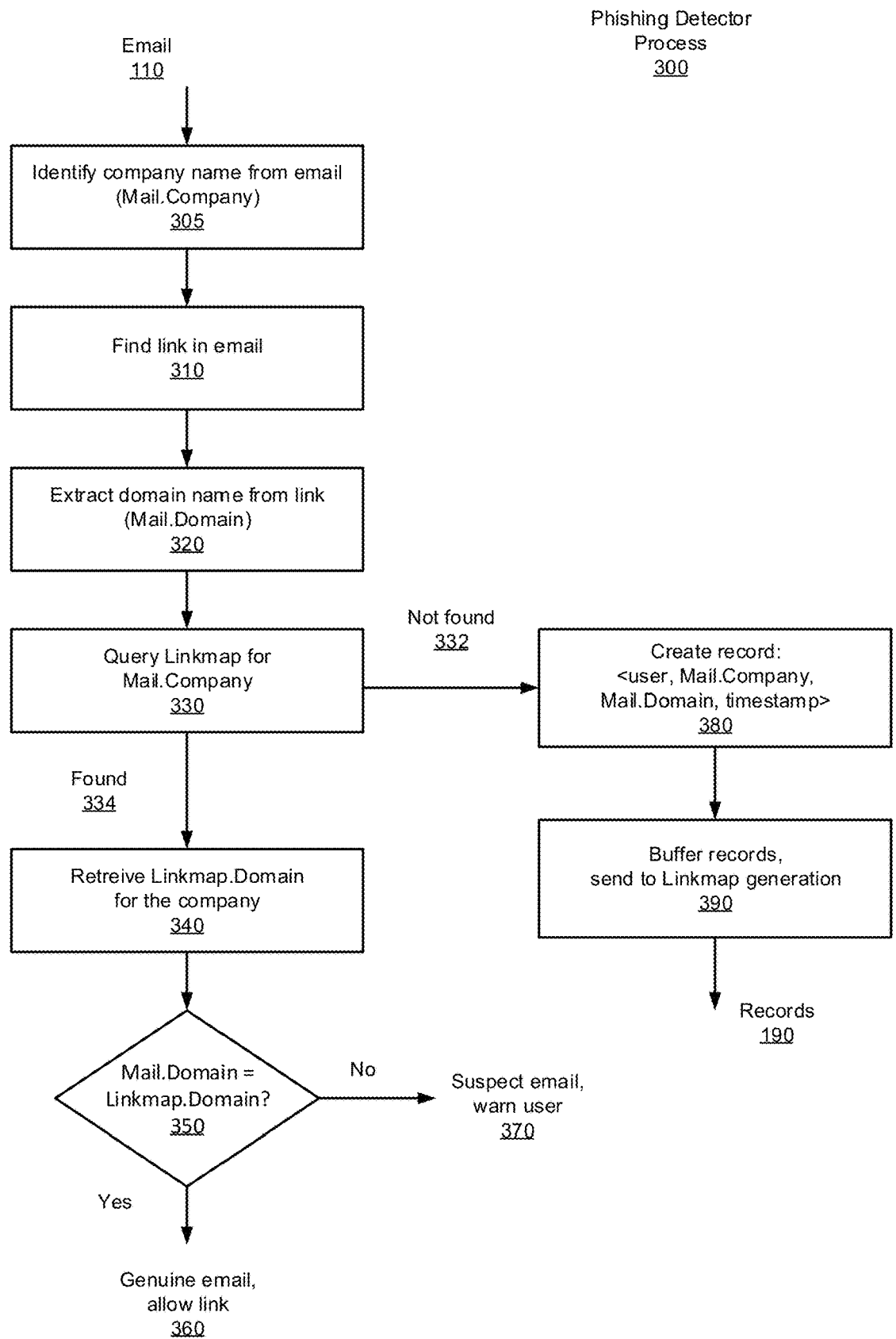
FIG. 3 is a flow diagram of a process for phishing detection, in accordance with an example of the present disclosure.

FIG. 3 is a flow diagram of a phishing detector process 300, executed by any combination of the system elements/components 130, 160, and 170 of FIG. 1, or the sub-components thereof, in accordance with an example of the present disclosure.

The phishing detector process 300 starts with identifying, at operation 305, a company name included in a received email 110. The company name is referred to herein as a data item labeled Mail.Company. Using the example phishing email 200 of FIG. 2, Mail.Company would be set to "XYZ-Company". In some examples, the identification of the company name is based on analysis of one or more of a signature block, an address in a footer of the email, an analysis of the logo, and an analysis of the body of text of the email. In some such examples, language processing techniques may be applied to the analysis to parse words in the text. In some examples, computer vision techniques may be applied to the analysis to classify an email as originating from a given company.

At operation 310, the email is searched for links. When a link is found, the domain name is extracted from the link at operation 320. The domain name is referred to herein as a data item labeled Mail.Domain. Referring again to the example phishing email 200, Mail.Domain would be set to "XYZCompanny.com".

At operation 330, the linkmap, 160 of FIG. 1, is queried, 180 of FIG. 1, for the company name, Mail.Company. If the name is found 334, then at operation 340 the domain name for the company is retrieved from the linkmap. The retrieved domain name is referred to herein as a data item labeled Linkmap.Domain. Then, at operation 350, Mail.Domain is compared to Linkmap.Domain and if they match, the email is determined to be genuine 360 and the user is allowed to navigate to the link. If they do not match, the email is determined to be suspect 370 and the user is warned against navigating to the link (and IT may be notified or a security log entry created).

Returning to operation 330, if the name is not found 332, then at operation 380, a new record is created for potential incorporation into the linkmap 160. In some cases, the new record may include an identification of the user, the company name (Mail.Company), the domain name (Mail.Domain), and a timestamp. At operation 390, the new record is buffered, and when a selected number of new records have been created, the buffered records 190 are sent to the linkmap generation and maintenance system 170 of FIG. 1.

Figure 4:
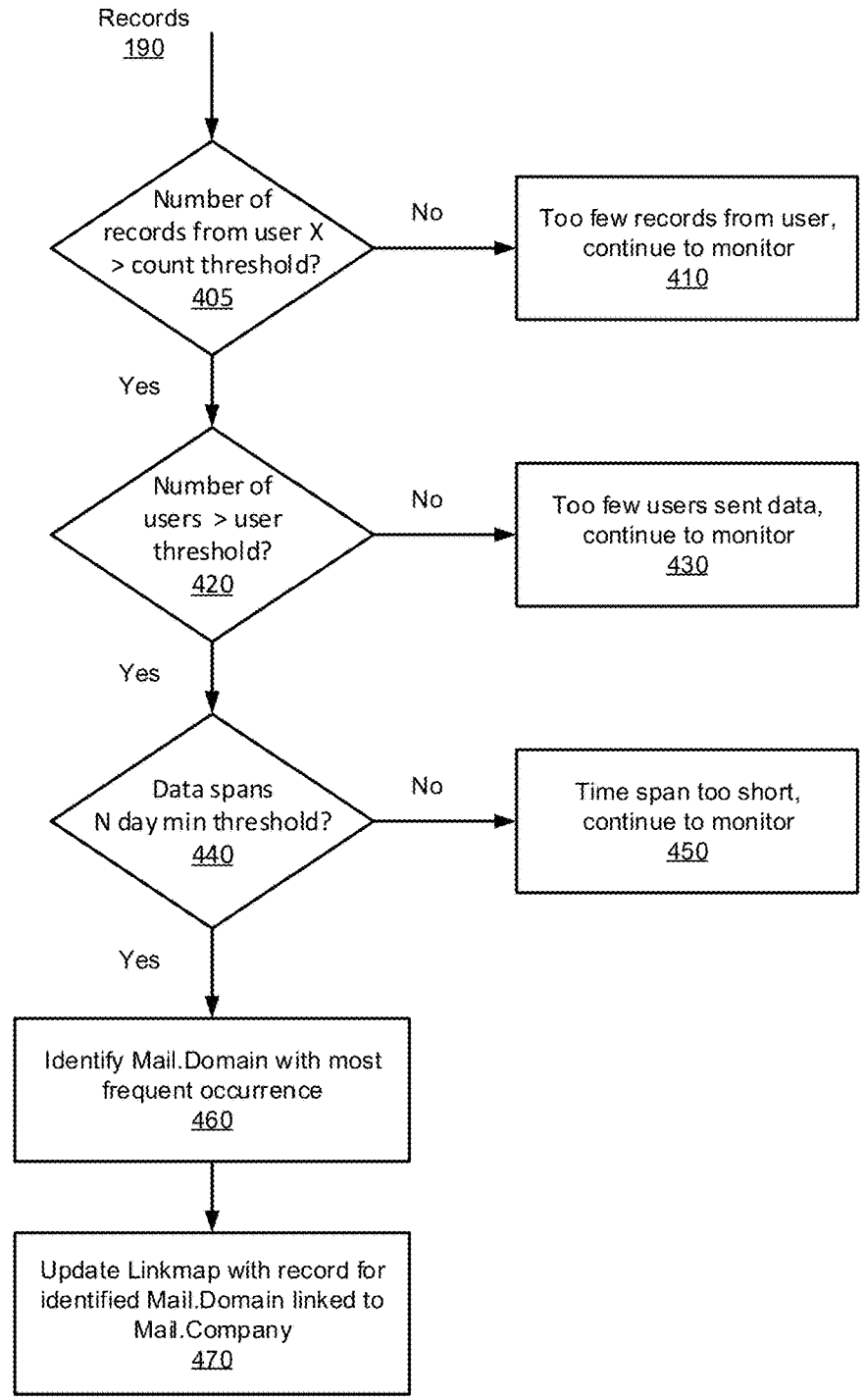
FIG. 4 is a flow diagram of a process for linkmap generation and maintenance, in accordance with an example of the present disclosure.

FIG. 4 is a flow diagram of a process 400 for linkmap generation and maintenance, executed by any combination of the system elements/components 130, 160, and 170 of FIG. 1, or the sub-components thereof, in accordance with an example of the present disclosure.

The linkmap generation and maintenance process 400 starts with receiving the buffered records 190, of FIG. 3, and determining, at operation 405, if the number of records from user X is greater than a count threshold. If not, then there are too few records from the user and, at operation 410, the linkmap generation and maintenance process 400 continues to monitor for new records 190.

Otherwise, if the number of records from user X is greater than the count threshold, then at operation 420, a determination is made as to whether the number of users providing records 190 is greater than a user threshold. If not, then too few users have sent data and, at operation 430, the linkmap generation and maintenance process 400 continues to monitor for new records 190.

Otherwise, if the number of users providing records 190 is greater than the user threshold, then at operation 440, a determination is made as to whether the data in the received records span a minimum time threshold (e.g., a selected number of hours, days, or weeks). If not, then the time span is too short and, at operation 450, the linkmap generation and maintenance process 400 continues to monitor for new records 190.

Otherwise, if the received records span the minimum time threshold (e.g., based on the provided timestamps), then at operation 460, the Mail.Domain value that occurs most frequently in the records is identified. Based on the number of records received from the number of users over the selected time span, it is determined that Mail.Domain is probably a legitimate domain name for Mail.Company. At operation 470, the linkmap is updated with a new record for the identified Mail.Domain linked to the associated Mail.Company, so that subsequent queries 180, of FIG. 1, to the linkmap can provide a legitimate domain name for the given company name.

In some examples, the values of the count threshold, the user threshold, and the minimum time threshold may be determined heuristically and/or tuned to provide a desired level of reliability.

In some examples, the linkmap 160 may also be updated with information obtained from a search engine that can provide trusted domain names associated with a given company name.

Figure 5:
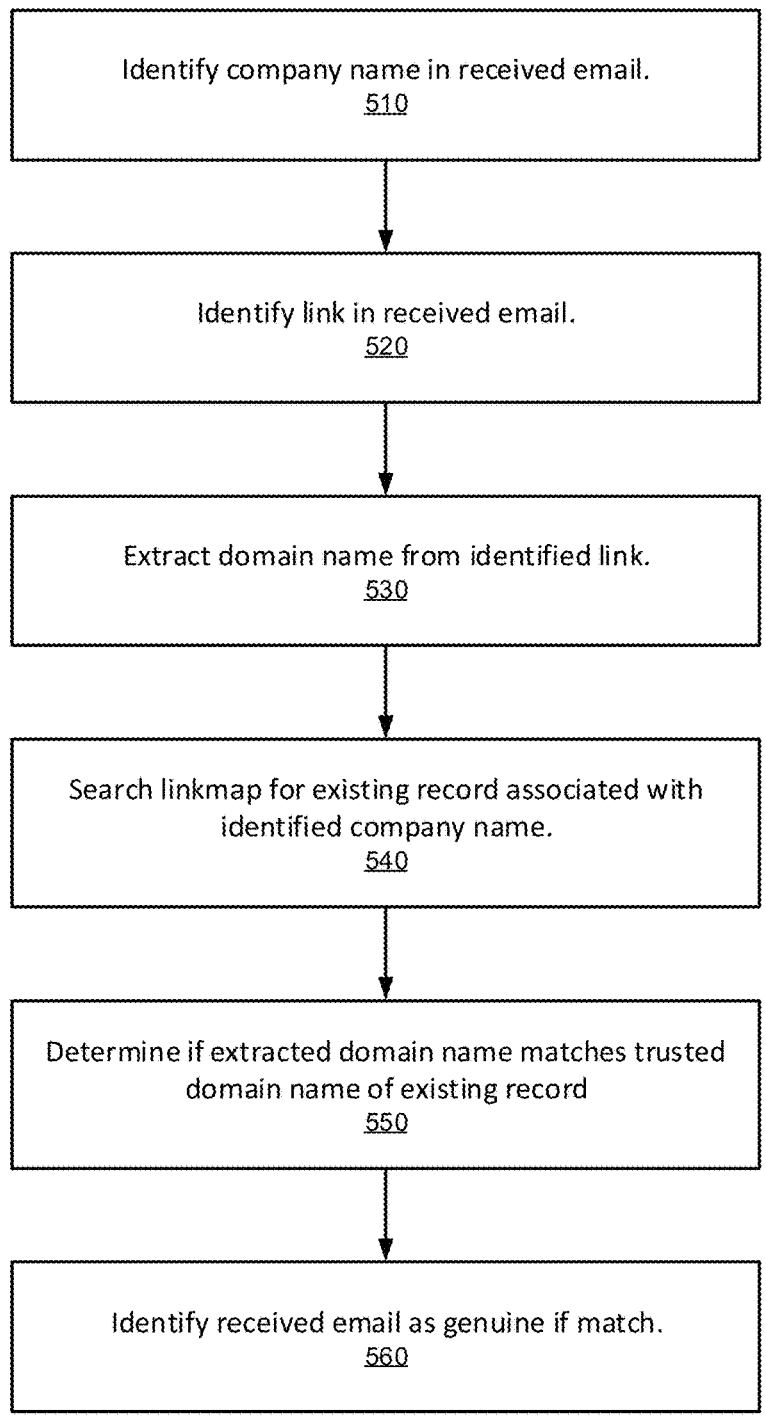
FIG. 5 is a flow diagram of a process for providing protection against theft of user credentials by email phishing attacks, in accordance with an example of the present disclosure.

FIG. 5 is a flow diagram of a process 500 for providing protection against theft of user credentials by email phishing attacks, executed by any combination of the system elements/components 130, 160, and 170 of FIG. 1, or the sub-components thereof, in accordance with an example of the present disclosure.

The process 500 starts with identifying, at operation 510, a company name included in a received email. In some examples, the identification may be based on an analysis of a signature, an address in a footer, a logo, or a body of text, included in the received email. In some examples, the analysis may employ computer vision techniques and/or language processing techniques.

Next, at operation 520, a link is identified in the received email, and at operation 530, a domain name is extracted from the identified link.

At operation 540, a linkmap is searched for an existing record associated with the identified company name. The linkmap comprises a collection of records that relate names of companies to trusted domain names associated with those companies.

At operation 550, a determination is made as to whether the extracted domain name matches a trusted domain name from the existing record obtained at operation 540.

At operation 560, the received email is identified as genuine if there is a match, otherwise a warning may be generated that the email is suspicious. The warning may be provided to the user and/or an IT administrator. In some examples, the user may be blocked from navigating to the link if the email is determined to be suspicious.

In some examples, a new record is created if the search of the linkmap fails to provide an existing record. The new record may include an identification of the recipient of the email, the identified company name, the extracted domain name, and a timestamp. A number of such new records may be accumulated over a period of time and the linkmap can be updated based on the new records when one or more of the number of new records exceeds a first threshold, the period of time exceeds a second threshold, and a number of email recipients exceeds a third threshold.

In some examples, a search engine may be employed to obtain a suggested trusted domain name associated with the identified company name.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Protection Against Theft of User Credentials

Figure 6:
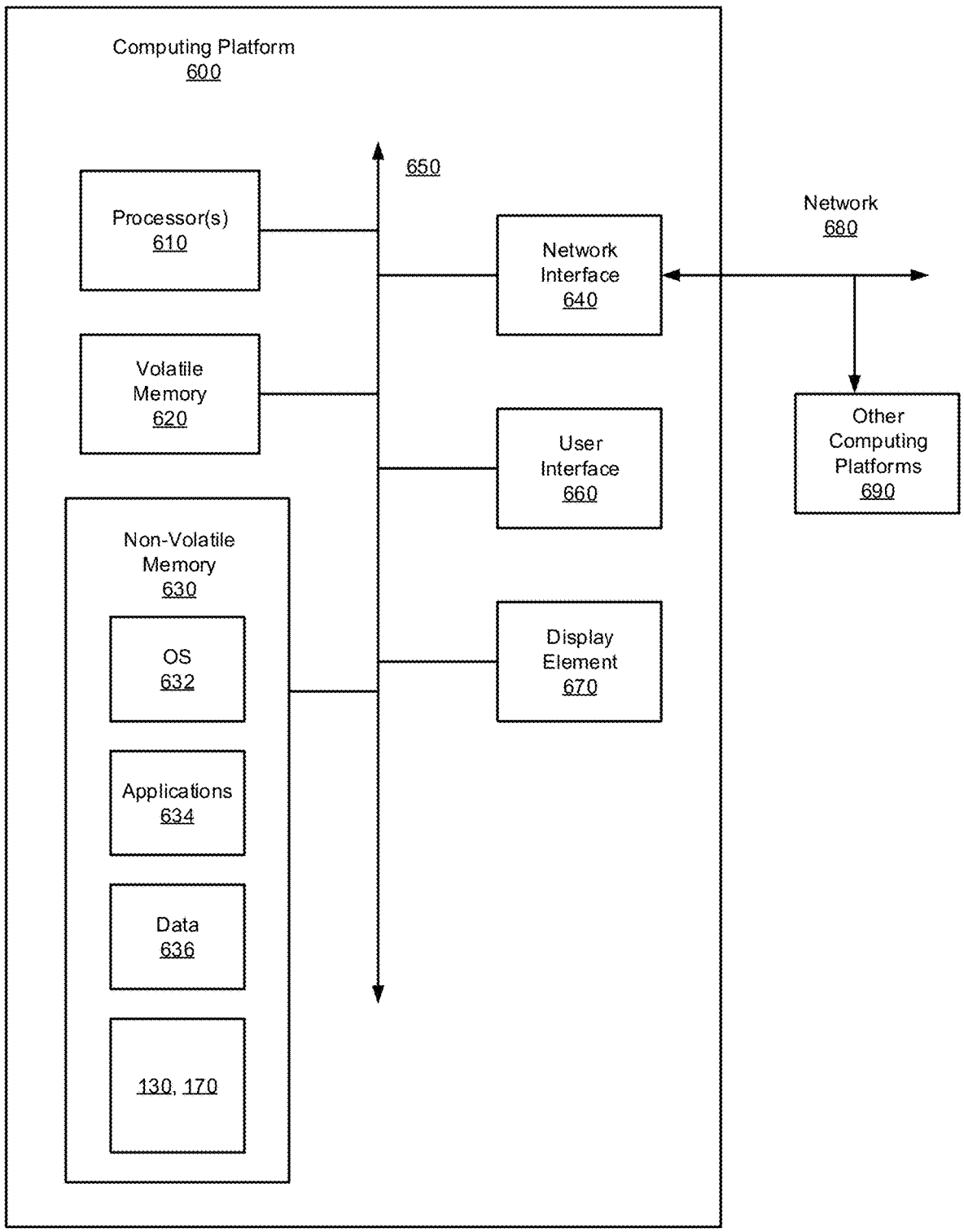
FIG. 6 is a block diagram of a computing platform configured to perform a process for providing protection against theft of user credentials by email phishing attacks, in accordance with an example of the present disclosure.

FIG. 6 is a block diagram of a computing platform 600 configured to perform a process for providing protection against theft of user credentials by email phishing attacks, in accordance with an example of the present disclosure. In some cases, the platform 600 may be a workstation, server, laptop, mobile device, or smartphone.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, a microphone, one or more speakers, one or more biometric scanners, one or more environmental sensors, and one or more accelerometers, etc.).

The display element 670, can provide a graphical user interface (GUI) and in some cases, may be a touchscreen or any other suitable display device.

The non-volatile memory 630 stores an operating system 632, one or more applications 634, data 636, and system elements 130, 160, and, 170 of FIG. 1, such that, for example, computer instructions of the operating system 632, the applications 634, and the system elements 130, 160, and 170, are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory; and
at least one processor coupled to the memory and configured to:
identify a company name included in a received email;
identify a link in the received email;
extract a domain name from the identified link;
search a linkmap for an existing record associated with the identified company name, wherein the linkmap comprises a collection of records, the records relating names of companies to trusted domain names;
determine if the extracted domain name matches a trusted domain name of the existing record;
if the domain name matches the trusted domain name, identify the received email as genuine;
if the search of the linkmap fails to provide the existing record, create a new record comprising an identification of a recipient of the email, the identified company name, the extracted domain name, and a timestamp.

2. The computer system of claim 1, wherein the at least one processor is further configured to generate a warning that the received email is suspect in response to a failure to determine the match.

3. The computer system of claim 1, wherein the at least one processor is further configured to identify the company name included in the received email based on analysis of one or more of a signature, an address in a footer, a logo, and a body of text, included in the received email.

4. The computer system of claim 1, wherein the at least one processor is further configured to identify the company name included in the received email based on application of computer vision techniques and/or language processing techniques to the received email.

5. The computer system of claim 1, wherein the at least one processor is further configured to accumulate a plurality of new records over a period of time and update the linkmap based on the new records when a number of the new records exceeds a first threshold, the period of time exceeds a second threshold, and a number of email recipients exceeds a third threshold.

6. The computer system of claim 1, wherein the at least one processor is further configured to employ a search engine to obtain a suggested trusted domain name associated with the identified company name and identify the received email as genuine in response to determining that the suggested trusted domain name matches the extracted domain name.

7. A method for protection against theft of user credentials comprising:

identifying, by a computer system, a company name included in a received email;

identifying, by the computer system, a link in the received email;

extracting, by the computer system, a domain name from the identified link;

searching, by the computer system, a linkmap for an existing record associated with the identified company name, wherein the linkmap comprises a collection of records, the records relating names of companies to trusted domain names;

determining, by the computer system, if the extracted domain name matches a trusted domain name of the existing record; and creating a new record, if the search of the linkmap fails to provide the existing record, wherein the new record comprises an identification of a recipient of the email, the identified company name, the extracted domain name, and a timestamp.

8. The method of claim 7, further comprising identifying the received email as genuine in response to the determination of a match and generating a warning that the received email is suspect in response to a failure to determine the match.

9. The method of claim 7, further comprising identifying the company name included in the received email based on analysis of one or more of a signature, an address in a footer, a logo, and a body of text, included in the received email.

10. The method of claim 7, further comprising identifying the company name included in the received email based on application of computer vision techniques and/or language processing techniques to the received email.

11. The method of claim 7, further comprising accumulating a plurality of new records over a period of time and updating the linkmap based on the new records when a number of the new records exceeds a first threshold, the period of time exceeds a second threshold, and a number of email recipients exceeds a third threshold.

12. The method of claim 7, further comprising employing a search engine to obtain a suggested trusted domain name associated with the identified company name and identifying the received email as genuine in response to determining that the suggested trusted domain name matches the extracted domain name.

13. A non-transitory computer readable medium storing executable sequences of instructions to provide protection against theft of user credentials, the sequences of instructions comprising instructions to:

identify a company name included in a received email;

identify a link in the received email;

extract a domain name from the identified link;

search a linkmap for an existing record associated with the identified company name, wherein the linkmap comprises a collection of records, the records relating names of companies to trusted domain names;

determine if the extracted domain name matches a trusted domain name of the existing record;

if the domain name matches the trusted domain name, identify the received email as genuine in response to the determination of a match; and if the search of the linkmap fails to provide the existing record, create a new record comprising an identification of a recipient of the email, the identified company name, the extracted domain name, and a timestamp.

14. The computer readable medium of claim 13, wherein the sequences of instructions further include instructions to generate a warning that the received email is suspect in response to a failure to determine the match.

15. The computer readable medium of claim 13, wherein the sequences of instructions further include instructions to identify the company name included in the received email based on analysis of one or more of a signature, an address in a footer, a logo, and a body of text, included in the received email.

16. The computer readable medium of claim 13, wherein the sequences of instructions further include instructions to identify the company name included in the received email based on application of computer vision techniques and/or language processing techniques to the received email.

17. The computer readable medium of claim 13, wherein the sequences of instructions further include instructions to accumulate a plurality of new records over a period of time and update the linkmap based on the new records when a number of the new records exceeds a first threshold, the period of time exceeds a second threshold, and a number of email recipients exceeds a third threshold.

18. The computer readable medium of claim 13, wherein the sequences of instructions further include instructions to employ a search engine to obtain a suggested trusted domain name associated with the identified company name and identify the received email as genuine in response to determining that the suggested trusted domain name matches the extracted domain name.

* * * * *